May 2, 1967 E. O. P. TATTER ET AL 3,317,212

TAPE CARTRIDGE CHANGER

Filed March 20, 1964 8 Sheets-Sheet 1

INVENTORS:
Ernest O. P. Tatter
Philip Vazzano
By Hofgren, Wegner,
Allen, Stellman & McCord Att'ys May 2, 1967 E. O. P. TATTER ETAL 3,317,212

TAPE CARTRIDGE CHANGER

Filed March 20, 1964 8 Sheets-Sheet 2

May 2, 1967 E. O. P. TATTER ETAL 3,317,212

TAPE CARTRIDGE CHANGER

Filed March 20, 1964 8 Sheets-Sheet 5

May 2, 1967 E. O. P. TATTER ETAL 3,317,212

TAPE CARTRIDGE CHANGER

Filed March 20, 1964 8 Sheets-Sheet 6

May 2, 1967 E. O. P. TATTER ETAL 3,317,212

TAPE CARTRIDGE CHANGER

Filed March 20, 1964

8 Sheets-Sheet 7

United States Patent Office 3,317,212

Patented May 2, 1967

3,317,212

TAPE CARTRIDGE CHANGER

Ernest O. P. Tatter, Addison, and Philip Vazzano, Des Plaines, Ill., assignors to Warwick Electronics Inc., a corporation of Delaware Filed Mar. 20, 1964, Ser. No. 353,486
20 Claims. (Cl. 274—11)

This invention relates in general to magnetic tape recording and reproducing apparatus, and more particularly to means for automatically handling a plurality of tape cartridges.

The general purpose of the present invention is to provide an improved device of the character described.

A more specific object of the invention is to provide improved tape recorder apparatus which is capable of handling a plurality of tape cartridges, and which will function to automatically and sequentially position each cartridge of the stack of cartridges in operating position.

Another object of the invention is to provide tape recorder apparatus as defined in the preceding paragraph with novel means for moving the cartridges into an operating position.

A further object of the invention is to provide new and improved means for positioning and locating a plurality of tape cartridges on a tape recorder.

A still further object of the invention is to provide, in a tape recorder capable of playing a plurality of tape cartridges, new and improved means for advancing the cartridges successively into playing position and for sensing the presence of the cartridge in the playing position.

Still another object is to provide a tape recorder as set forth in the preceding paragraph with an improved cartridge brake releasing device which functions to release the cartridge brake as the cartridge is moved into the playing position.

And another object of the invention is to provide an improved reel drive shaft construction.

Further objects and advantages will become apparent from the following detailed description taken in connection with the accompanying drawings in which.

Figure 1A:
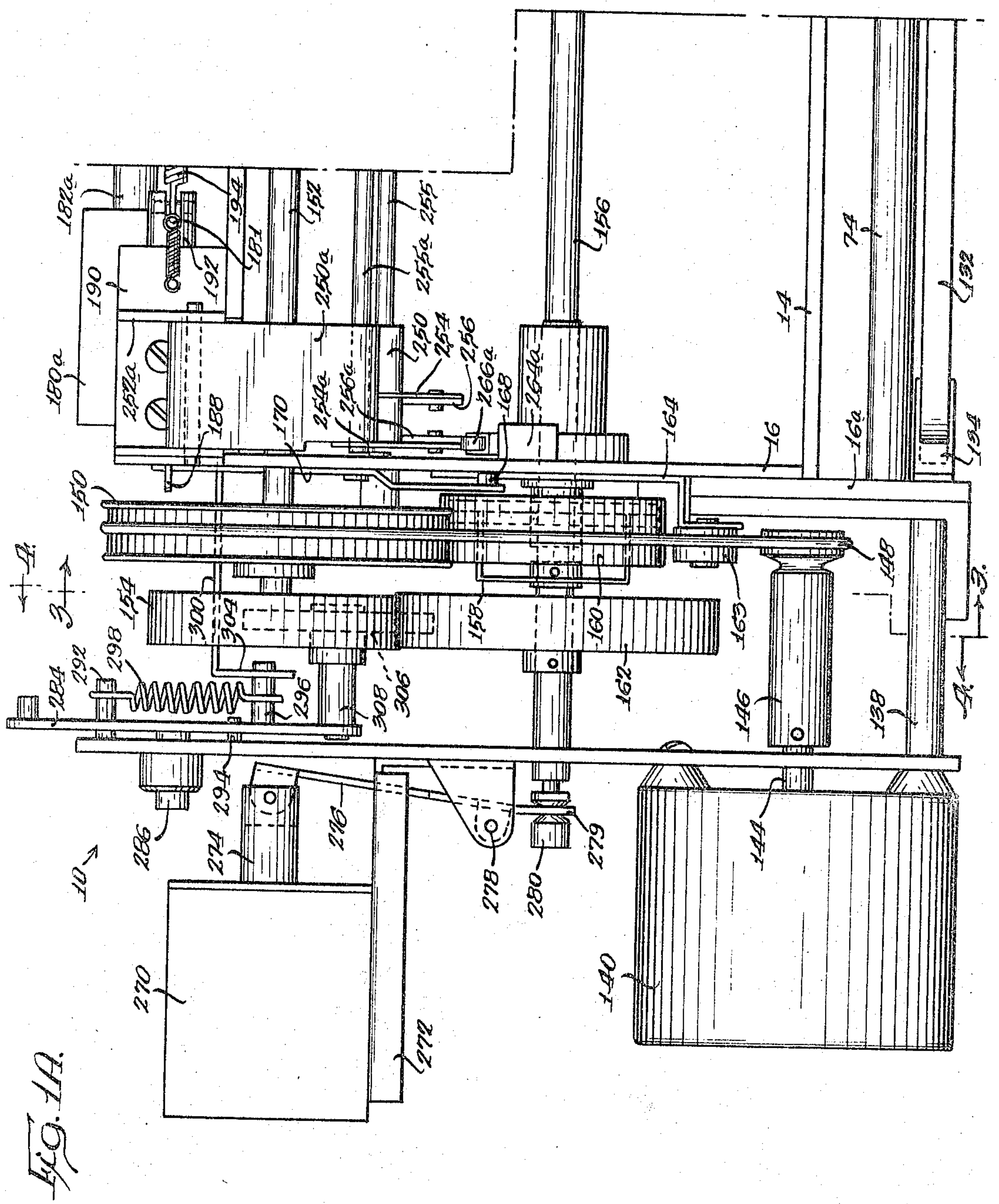
FIG. 1A is a partial front elevational view showing one end of a preferred embodiment of the invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 1B:
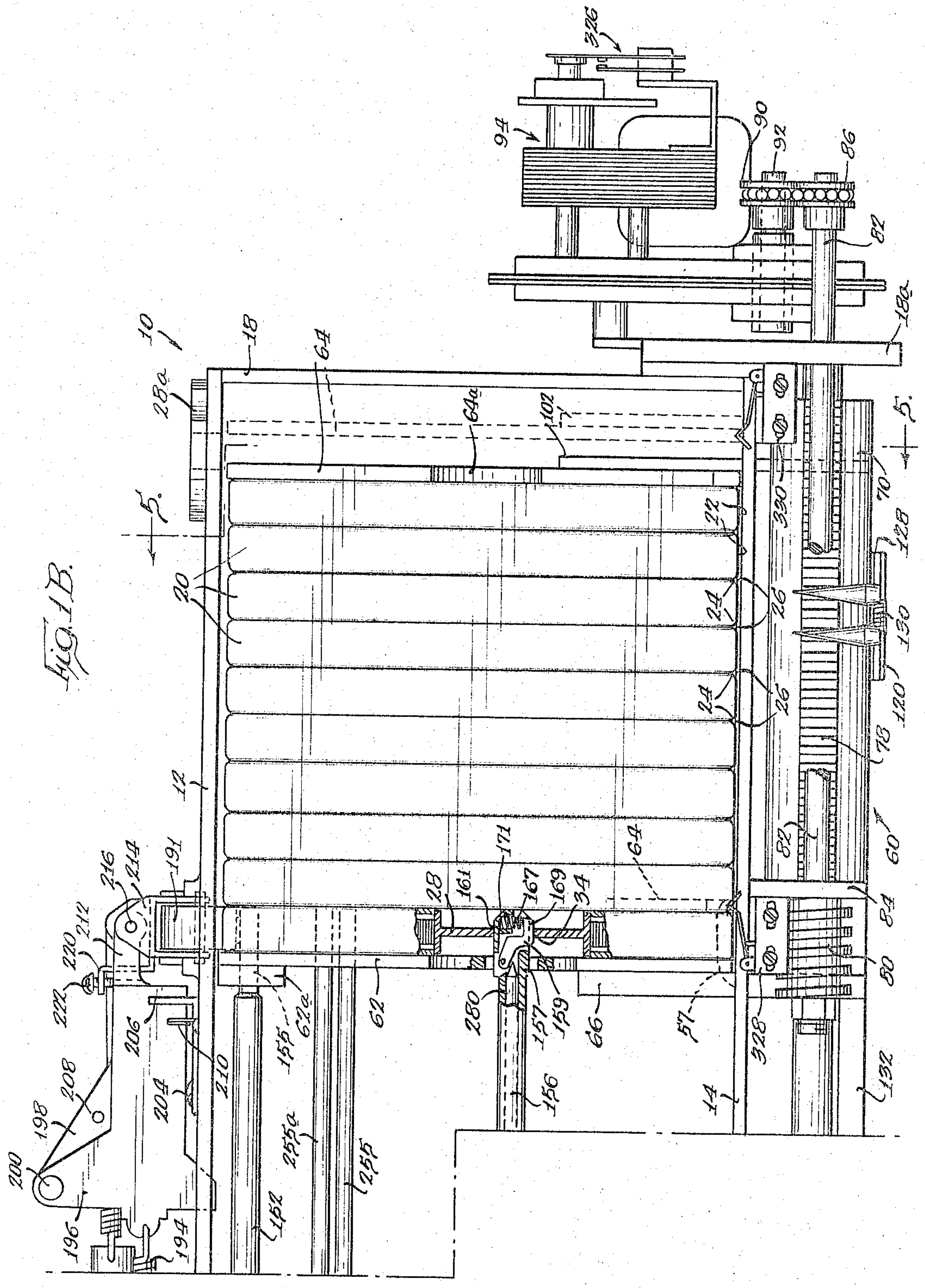
FIG. 1B is a continuation of FIG. 1A showing the other end of the preferred embodiment of the invention, with certain parts broken away for clarity.

Referring now to the drawings, where like reference characters designate like or corresponding parts throughout the several views, the preferred embodiment of the tape recorder is shown generally at 11 in FIG. 1A and FIG. 1B, and includes a frame having an upper deck 12, a lower deck 14, and spaced sides 16 and 18. Legs **16*a* and 18*a* are fixedly secured to sides 16 and 18, respectively, and are adapted to be seated upon a suitable support, not shown, that is provided on a surrounding enclosure, also not shown. Spaced decks 12 and 14, and sides 16 and 18, collectively define a horizontally disposed slideway that is adapted to receive a plurality of tape cartridges, shown at 20** in FIG. 1B. While the stack of cartridges shown in FIG. 1B includes ten cartridges, it should be understood that any number of cartridges more or less than ten may be used with the illustrated embodiment of the invention, with the number ten having been selected for purposes of illustration only.

Figure 5:
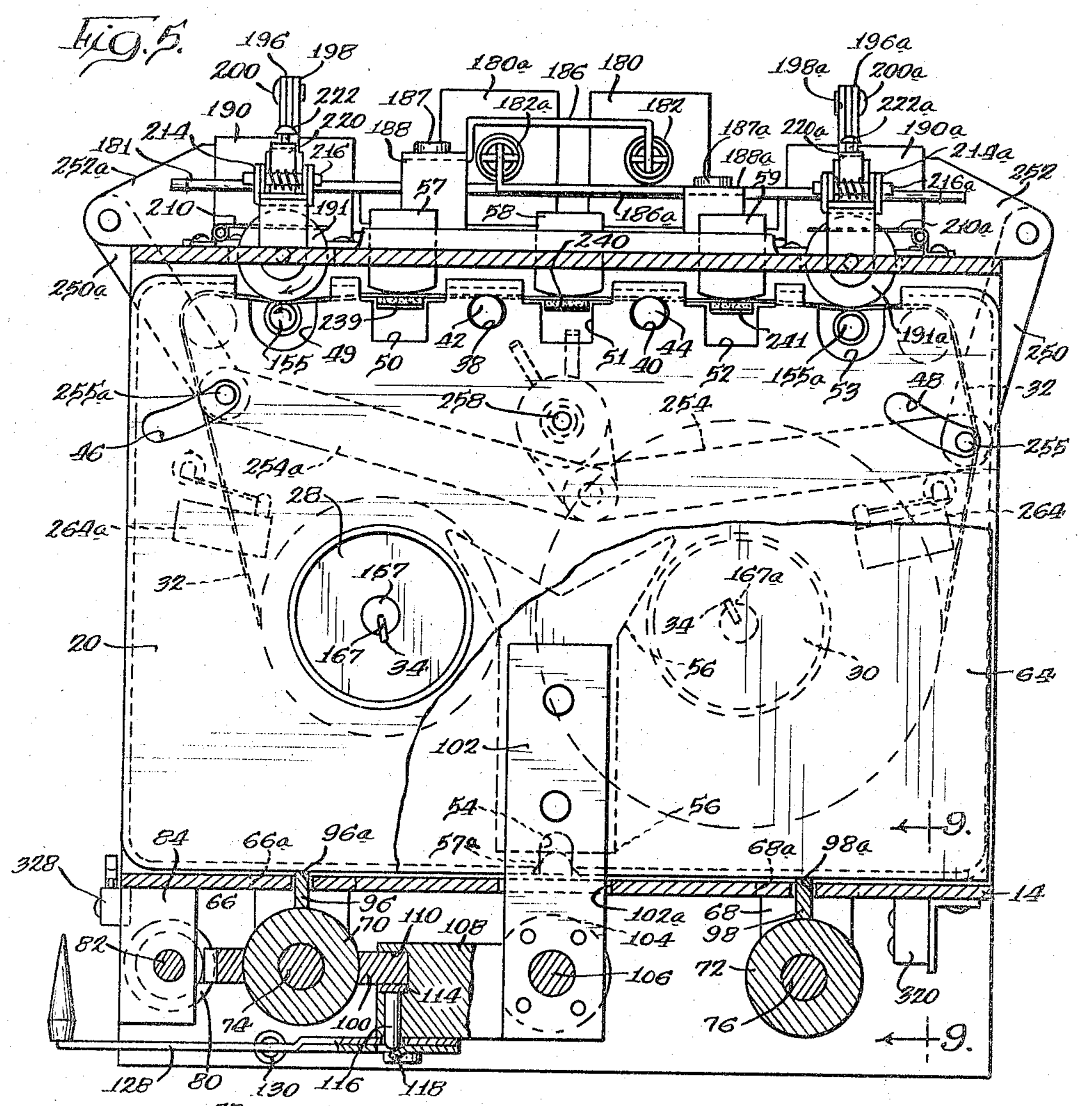
FIG. 5 is a sectional view taken substantially as shown along line 5—5 of FIG. 1B, with certain parts broken away for clarity.
Figure 16:
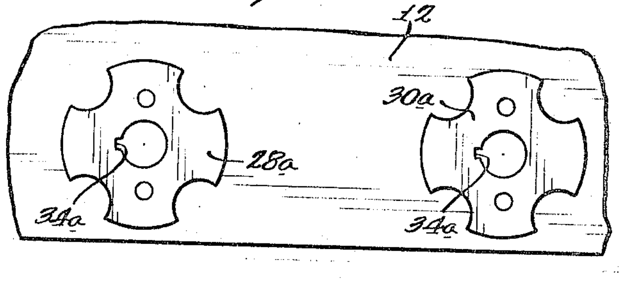
FIG. 16 is a fragmentary top plan view showing templates for forming notches in the tape cartridge reels.
Figure 11:
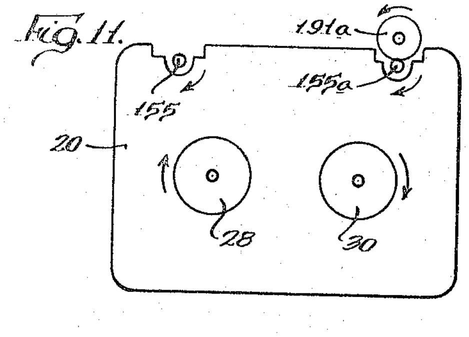
FIG. 11 is a fragmentary elevational view, similar to FIG. 5 but with certain parts broken away for clarity, showing the direction of rotation of various elements corresponding to the positioning of the linkage as shown in FIG. 10.
Figure 13:
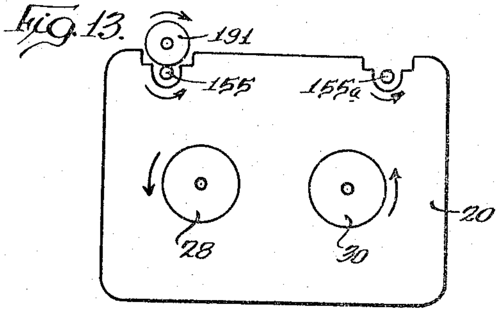
FIG. 13 is a view similar to FIG. 11, showing the direction of rotation of various elements corresponding to the position of the linkage shown in FIG. 12.

Each tape cartridge is generally rectangularly shaped, as is best seen in FIGS. 5, 11 and 13, and includes a generally planar undersurface 22 which is adapted to rest upon a cartridge stack translating device to be hereafter described. The undersurfaces of each tape cartridge 20 are provided with rounded edges 24 so as to provide gaps 26 between adjacent cartridges, and adjacent the leading end trailing edges of the leading and trailing cartridges. A pair of apertured reels 28 and 30 are rotatably mounted in aligned apertures in the side walls of each cartridge 20, with a quantity of tape 32 being trained thereover. The apertures of reels 28 and 30 are each provided with at least one radial slot 34 which is adapted to be drivingly engaged by a spring biased pawl to be hereafter described. As can be best seen in FIG. 16, slots 34 may be formed by placing the reels 28 and 30 of a cartridge over a pair of templates **28*a* and 30*a*, each having a slot 34*a* which may be conveniently formed at the right hand end of top deck 12, as viewed in FIG. 1B; and then forcing a broach like tool, not shown, through the reel apertures to define slots 34. The sides of each cartridge are provided with spaced apertures 38 and 40 adjacent the upper edge thereof which respectively slidably receive rods 42 and 44 that are fixed to the side 16 of the frame. As can be best seen in FIG. 5, hole 38 is oblong, whereas hole 40 is round. Rods 42 and 44 are provided with a portion of reduced diameter inwardly of their respective outer ends, which serve as guide means to properly locate the tape relative to the magnetic heads to be hereafter described, it being understood that rods 42 and 44** are loosely received in apertures 38 and 40 so that the cartridges 20 are free to move along the rods without binding. Opposed sides of each cartridge 20 are provided with aligned arcuate slots 46 and 48 at opposite sides of the cartridge, the purpose of which will hereinafter appear, and each cartridge also includes a plurality of recesses 49–53 which are in the upper edge thereof, the purpose of which will also hereinafter appear. The central portion of the lower surface of each cartridge 20 is provided with a recess 54, which is spanned by a suitable brake 56, such as that disclosed in Knoth Patent 3,146,316. As is explained in detail in the above mentioned application, the brake functions to lock reels 28 and 30 against rotation when the cartridge is not in use, or is not in the operating position. An upright brake release member 57*a* is provided centrally on deck 14 in the playing position so that as a cartridge is moved into the playing position, the release member 57*a* releases brake 56 to free reels 28 and 30 for rotation.

A playback record head 57, erase head 58, and playback record head 59 are each mounted in suitable openings provided in upper deck 12. Heads 57–59 are positioned in transverse alignment (FIG. 2) and define thereunder, between upper deck 12 and lower deck 14, a tape operating position. Means shown generally at 60 in FIG. 1B are provided to successively index each of the cartridges 20 in the stack of cartridges into the tape operating position.

The means for advancing the stack of tape cartridges includes a vertically extending leader plate 62, shown in FIG. 1B engaging the leading side of the first tape cartridge, and a vertically extending follower plate 64, shown in FIG. 1B engaging in the trailing edge of the last tape cartridge. The side potrions of plates 62 and 64, facing the front of the device, are recessed as at 62*a* and 64*a*, to facilitate the manual insertion and removal of cartridges therebetween. Mounting legs 66 and 68 are fixedly secured to plate 62 at transversely spaced positions thereon, and extend below lower deck 14 through suitable longitudinally extending slots 66*a* and 68*a* (FIG. 5) that are provided in lower deck 14 to enable the plate 62 to move longitudinally of the tape recorder. Leg members 66 and 68 are fixedly secured to hollow cylindrical slide members 70 and 72, respectively, that are mounted for sliding movement respectively on longitudinally extending guide bars 74 and 76, which extend between legs 16*a* and 18*a*. A rack 78 is integrally associated with slide 70, and extends the entire length thereof, as is best seen in FIG. 1B. A worm gear 80 is fixed on a shaft 82, and meshes with rack 78 to move slide 70 longitudinally of the tape recorder frame. Shaft 82 is rotatably journalled in a frame member 84, depending from the undersurface of lower deck 14, and in leg member 18*a*, with a sprocket 86 being provided at the right hand end of the shaft, as viewed in FIG. 1B. A chain 88 is trained over sprocket 86, and over another sprocket 90 carried by the output shaft 92 of a two-directional transport motor 94, which is suitably secured to leg 18*a*. It will be readily apparent that when motor 94 is energized, sprocket 90 will drive chain 88, which in turn will drive sprocket 86 and rotate shaft 82. Worm gear 80 will drive rack 78, and thus slides 70 and 72 will be moved longitudinally of the tape recorder frame, carrying leader plate 62 therewith. Upwardly extending arms 96 and 98 are integrally associated with the slides 70 and 72, respectively, and coact with respective narrow slots 96*a* and 98*a* in lower deck 14, to guide the slides in their longitudinal movement. The upper surfaces of arms 96 and 98 are disposed above deck 14, and cartridges 20 rest thereon, so that the cartridges are supported through out their longitudinal movement.

A radially outwardly disposed leg 100 is integrally associated with slide 70 on a side opposite from rack 78, and cooperates with structure to be immediately hereafter described to provide means for locking follower plate 64 for longitudinal movement with leader plate 62.

Figure 6:
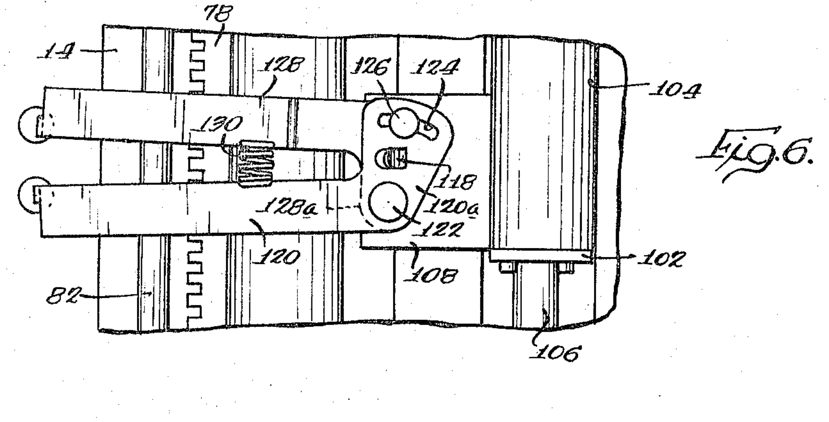
FIG. 6 is a fragmentary bottom plan view showing part of the tape cartridge holding means of the present invention.

A depending leg 102 is fixed to the central portion of plate 64, and extends downwardly through lower deck 14 through a longitudinally extending slot 102*a*. The lower end of leg 102 is secured to a cylindrical slide 104. Slide 104 is tubular, and is mounted for sliding movement on a longitudinally extending guide rod 106 which is fixed between legs 16*a* and 18*a*. A block 108 (FIGS. 5 and 6) is fixed to the side of slide 104 facing slide 70, and contains a laterally open groove 110 which receives leg 100. A suitable strip of material 114, having a high coefficient of friction, is provided on the lower surface of groove 110, and is urged into engagement with the undersurface of leg 100 by a vertically disposed pin 116 that is received in a vertical opening in block 108. Pin 116 is urged upwardly into engagement with strip 114 by an outwardly struck tab 118 carried by a pivotally mounted lever 120. Lever 120 is pivotally secured to block 108 by a suitable pivot pin 122, and lever 120 includes an enlarged end portion 120*a* having an arcuate slot 124. A second pin 126 impales slot 124 and is fixed in block 108. Pins 122 and 126 engage the enlarged end portion 128*a* of a second lever 128, to fixedly mount lever 128 relative to block 108. A spring 130 is biased between levers 120 and 128 to urge lever 120 in a counterclockwise direction, as viewed in FIG. 6, so that tab 118 is urged into engagement with pin 116. When the outer end portions of levers 120 and 128 are squeezed together, lever 120 will be pivoted in a clockwise direction, as viewed in FIG. 6, and tab 118 will be moved out of engagement with pin 116, so that the strip 114 is no longer in binding engagement with leg 100, and slide 104 is free to move relative to slide 70. By squeezing levers 120 and 128, plate 64 may be moved relative to plate 62, to enable cartridges to be removed from the stack or to enable additional cartridges to be placed in the stack. When levers 120 and 128 are released, strip 114 will frictionally lock slide 104 to slide 70, so that the plates 62 and 64 will move as a unit when motor 94 is actuated. Thus, plate 64 prevents separation of the cartridges 20 during lateral travel of the cartridge stack. A self-coiling spring 132 is mounted on a bracket 134, that is secured to leg 16*a*, with the end portion of the spring being connected to slide 104 to urge it to the left, as viewed in FIG. 1B. Thus, when a stack of cartridges is in position in the tape recorder, and levers 122 and 128 are squeezed together, spring 132 will function to urge plate 64 into snug engagement with the last cartridge of the cartridge stack, to assist in retaining the cartridges in proper alignment.

Figure 2:
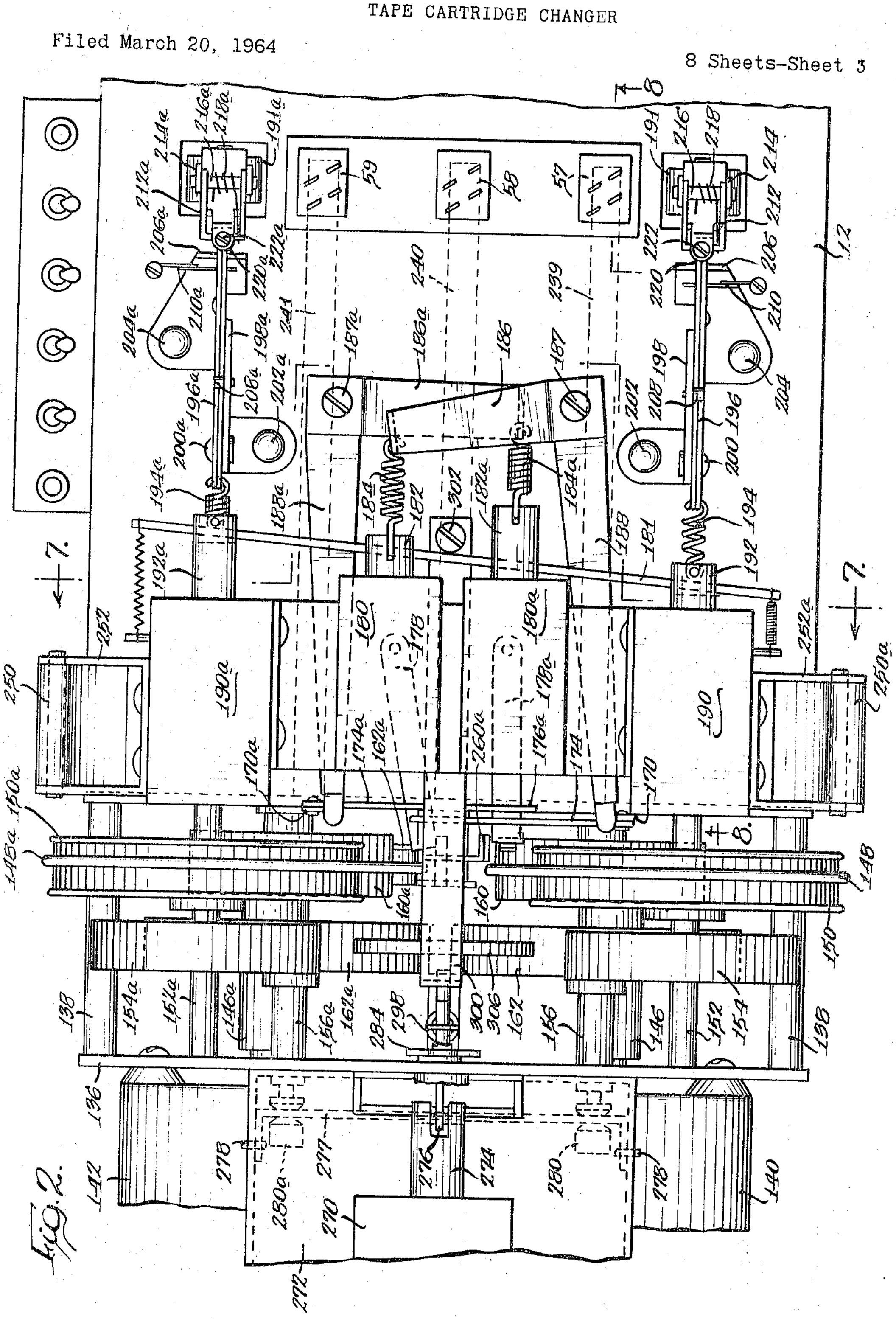
FIG. 2 is a fragmentary top plan view of the apparatus illustrated in FIG. 1A and FIG. 1B.

Referring now to FIG. 1A and FIG. 2, a vertical wall 136 is mounted in spaced relation with respect to side 16 by a plurality of posts 138. Suitable means for driving the tape 32, on the cartridge which is in the playing position, are mounted adjacent wall 136, and include a pair of drive motors 140 and 142. The mechanism associated with motor 140 is substantially identical to that associated with motor 142, so that common reference numerals are used to indicate corresponding parts, with the subscript "*a*" being added to the reference numerals indicating the mechanism elements associated with motor 142. Only one mechanism will be described in detail, with it being understood that the description given applies equally to each mechanism. It should also be kept in mind that in a more simplified form of the invention, a single drive motor and playback record head may be provided, if it is desired to operate in one direction only. Motor shaft 144 extends inwardly through a suitable opening provided in wall 136, and carries a sheave 146, that is positioned between walls 136 and 16. A belt 148 is trained over sheave 146, and drives a substantially larger sheave 150 that is fixed to a capstan shaft 152 which is rotatably mounted in sides 136 and 16. A suitable drive wheel 154 is provided on shaft 152 adjacent sheave 150 for a purpose to be hereafter described. Shaft 152 extends rearwardly through side 16, passes closely adjacent to the underside of top deck 12, and is provided with a narrowed end portion 155 adjacent the playing position, which defines a tape drive capstan, as will hereinafter become fully apparent. Bearing blocks 62a are provided on plate 62 to rotatably support shafts 152 and 152a.

A shaft 156 is rotatably mounted in suitably aligned apertures in walls 16 and 136, and extends rearwardly to the playing position, where it is provided with suitable drive means, to be hereafter described, for connection with tape reel 28. A clutch input member 158 is fixed to shaft 156 for rotation therewith, and is adapted to drive a clutch output member 160 mounted on shaft 156 by suitable slip drive means, for rotation of clutch member 160 with shaft 156, and for rotation relative thereto. A wheel 162 is fixed on shaft 156 adjacent clutch member 158, and includes a generally cylindrical outer periphery, the purpose of which will hereinafter appear. Clutch member 160 also has a generally cylindrical outer surface, which is adapted to be engaged by belt 148, to drive shaft 156 when a cartridge is in the playing position. As can be best seen in FIG. 3, clutch output member 160 has a smaller diameter than sheave 150, so that shaft 156 will be driven at a faster speed than shaft 152. However, because of the slippage of member 160, capstan shaft 152 will provide the positive drive to tape 32, and shaft 156 will function to keep the tape taut.

Means are provided for holding belt 148a out of engagement with clutch member 160a when shaft 156 is being rotated, and for allowing belt 148a to engage clutch member 160a when it is desired to rotate 156a, and includes an idler pulley 163a (FIG. 3) carried by a link 164a that is pivotally mounted on shaft 156a. A spring 165a is connected between link 164a and a post fixed on wall 16, to urge idler 163a toward belt 148a. Link 164a includes an enlarged portion 166a, on an opposed side of shaft 156a from idler 163a, and which is positioned for engagement with a pin 168a carried by a link 170a. Link 170a is pivotally mounted on wall 16 at 172a, and it will be understood that upon clockwise movement of link 170a, as viewed in FIG. 3, idler 163a will move in counterclockwise direction, and allow belt 148a to engage clutch member 160a. The upper end of link 170a is pivotally connected to a transversely extending link 174a, having a hooked end portion 176a. Hooked portion 176a of link 174a engages the side of a generally longitudinally extending link 178a, which is pivotally mounted to the upper deck 12 for a purpose which will hereinafter appear. A solenoid 180 is positioned generally above link 178a on upper deck 12, and includes a plunger 182a connected by a spring 184a to a bell crank 186a. Bell crank 186a is pivotally connected to upper deck 12 at 187a, and includes a generally longitudinally extending portion 188a, that has its end portion engaging link 170a for actuation thereof. A transverse rod 181 extends between plunger 182 and 182a, and is held in a notch suitably provided in the ends thereof, to retain the plungers in alignment.

A second pair of solenoids 190 and 190a are provided on upper deck 12 for actuation of pressure rollers 191 and 191a, respectively, that are positioned in the cartridge operating position. The mechanism associated with solenoid 190 is identical to that associated with solenoid 190a, so that only one mechanism will herein be described in detail. Common reference numerals have been used to indicate corresponding parts in each mechanism, with the subscript *a* being appended to the elements associated with solenoid 190a. A plunger 192 is reciprocally associated with solenoid 190, and is connected by a spring 194 to the end of a longitudinally extending link 196. Link 196 is mounted for pivotal movement relative to a stationary bracket 198 by a transverse ly extending pivot pin 200. Bracket 198 is fixed to the upper deck 12 at 202 and 204, and includes an upwardly extending bifurcated end portion 206, which receives link 196 and functions to guide it in its pivotal movement. A pin 208 is fixed to bracket 198, and engages the upper surface of link 196 to limit the upward movement thereof. A transversely extending coiled spring 210 is fixed to upper deck 12, and extends under and engages the undersurface of link 196 to urge it upwardly into engagement with pin 208 when solenoid 190 is not energized. Link 196 terminates in a yoke 212, which is received between the spaced legs of a yoke 214 that supports pressure roller 191. A pivot pin 216 impales yokes 212 and 214, to provide a self-aligning construction for the pressure roller. A torsion spring 218 surrounds pin 216, and engages yokes 212 and 214, to urge a rearwardly extending extension 220 of yoke 214 toward the upped surface of link 196. A screw 222 passes through a suitably threaded hole in extension 220, and engages the upper surface of link 196, to provide means for adjusting the position of the pressure roller 191 relative to link 196.

Figure 7:
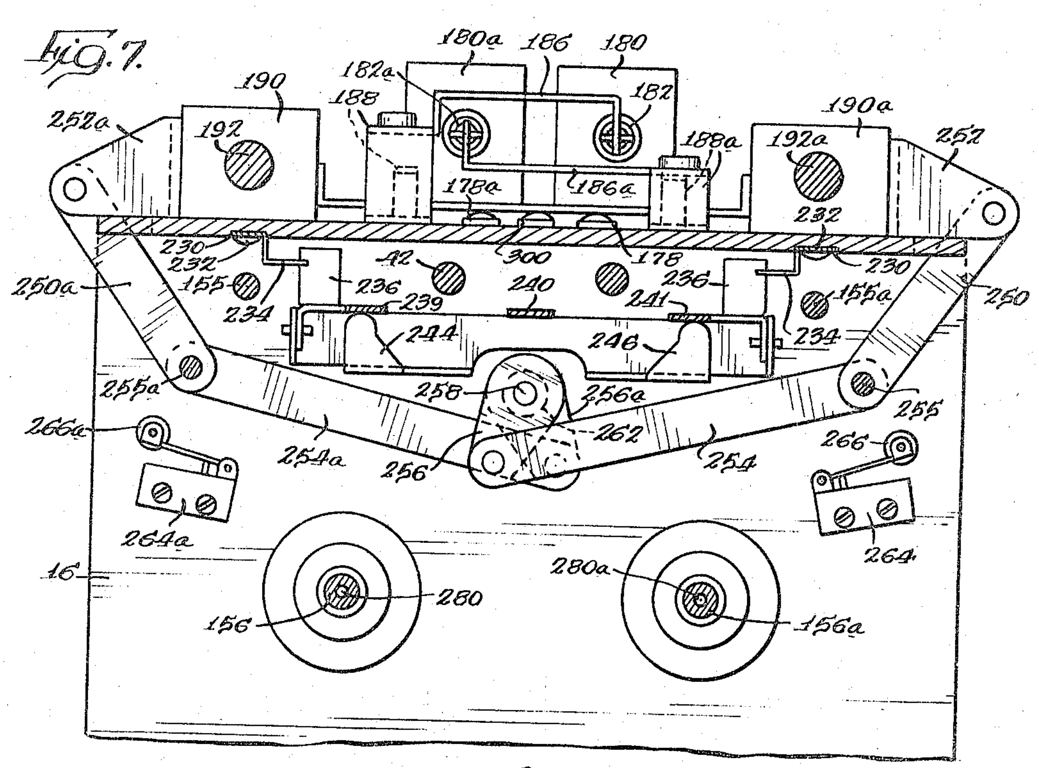
FIG. 7 is a fragmentary sectional view taken substantially as shown along the line 7—7 of FIG. 2.
Figure 8:
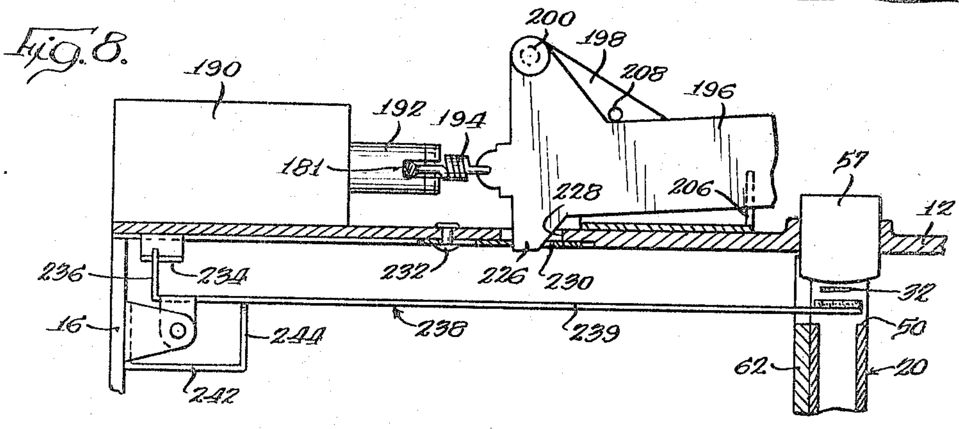
FIG. 8 is an enlarged sectional view taken substantially as indicated along line 8—8 of FIG. 2.

Links 196 and 196a each include an abutment 226 which extends downwardly thorugh a suitable aperture 228 in upper deck 12, as is best seen in FIG. 8. Each abutment 226 is received in a suitable slot in a longitudinally extending finger member 230, which is positioned in a groove in the undersurface of top deck 12. Fasteners 232 cooperate with suitable longitudinal slots in fingers 230, to hold the fingers against top deck 12, and to enable them to move in a longitudinal direction relative to the top deck. Fingers 230 carry slotted abutments 234 on their end portions, adjacent side 16, which receive therein the upstanding flanges 236 on the end of a pressure pad arm 238. Pressure arm 238 consists of three spaced fingers 239, 240 and 241, each of which extends longitudinally along the tape recorder frame to the playing position, with the fingers being received in openings 50, 51 and 52, respectively. Arm 238 is pivotally secured to a bracket 242, that is mounted to the frame member 16, and includes supports 244 and 246 (FIG. 7), upon which fingers 239 and 241 rest when the solenoids 190 and 190a are not energized. It will be readily understood, for example, that when solenoid 190 is energized, plunger 192 will be retracted into the solenoid body, and link 196 will be pivoted in a clockwise direction as viewed in FIG. 1B about pivot 200. Abutment 226 will engage finger 228 to move it to the left, as viewed in FIG. 8, to pivot pressure arm 238 in a counterclockwise direction and move fingers 239–141 into engagement with the tape 32, which is held against heads 57–59.

Figure 3:
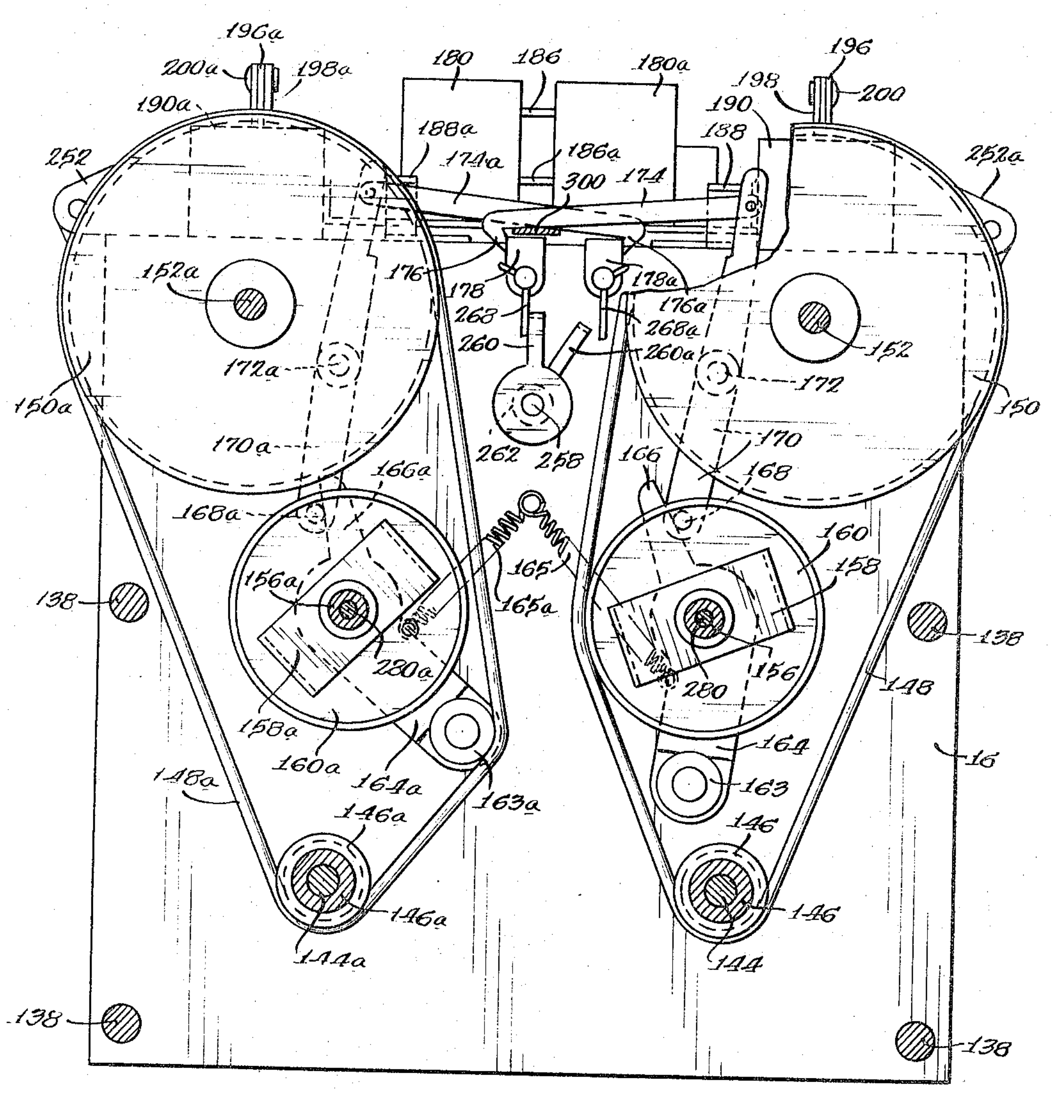
FIG. 3 is a sectional view taken substantially as shown along line 3—3 in FIG. 1A.

Means are provided for interrupting the drive to the driven reel and capstan when the end of the tape is reached, and will best be understood from a consideration of FIG. 5 and FIG. 7. Links 250 and 250a are provided adjacent one side of wall 16, and pivotally mounted at their upper ends to brackets 252 and 252a, respectively, which are secured to the top deck 12 adjacent solenoids 190 and 190a. The lower end portion of links 250 and 250a are respectively connected to the outer end portions of generally transversely extending links 254 and 254a by longitudinally extending rods 255 and 255a, which extend through suitable arcuate slots in 62, that are aligned with cartridge slots 46 and 48. The inner end portions of links 254 and 254a are pivotally connected to cranks 256 and 256a, respectively. Crank 256 is fixed on a shaft 258 which extends through wall 16, with a generally upwardly extending finger 260 being fixed on shaft 258 on the other side of wall 16 (FIG. 3). Crank 256a is fixed to a sleeve 262 that is rotatably mounted on shaft 258, and which extends through wall 16, where a generally upwardly extending finger 260a is fixed thereon.

Switches 264 and 264a are mounted on wall 16, and include switch operating members 266 and 266a, respectively, which are positioned in the path of travel of links 254 and 254_a_, respectively. When solenoids 180, 180_a_, 190 and 190_a_ are inactive, the parts are in the position shown in FIG. 7. When solenoids 180 and 190 are energized, belt 148 drives shaft 152, and idler 162 is moved out of engagement with belt 148 to allow the belt to drive clutch member 160 and shaft 156, as can best be seen in FIG. 3. A spring 268, carried by the downturned end of link 178, engages finger 260, to pivot shaft 258 and crank 256, and move link 254 into engagement with switch operating member 266. As will hereinafter be more fully explained in detail, switch 264 is connected in a suitable circuit to motor 140, and thus when link 254 is moved out of engagement with switch operating member 266, the drive to capstan 155, and to the reel shaft 156, is interrupted. When link 254 is in the position shown in FIG. 5, wherein capstan 155 is driving tape 32 from supply reel 30 to take-up reel 28, it will be noted that rod 255 is in the right hand end of arcuate slot 48 of the tape cartridge in the operating position. Tape 32 passes around the outside of rod 255, and it will be appreciated that when the end of the tape is reached, the tape will apply a lateral force to rod 255 and move it across slot 48, thus moving link 254 out of engagement with switch operating member 266, and interrupting the drive of motor 140.

The means by which shaft 156 drives take-up reel 28 will be best understood from a consideration of FIG. 1A and FIG. 1B. A solenoid 270 is mounted on a bracket 272 that is secured to wall 136. A generally vertically extending link 276 is pivotally secured at its upper end to the plunger 274 of solenoid 270. A transversely extending arm 277 is fixed to link 276 and is pivotally mounted on bracket 272 at 278. Dependent portions 279 are connected to rods 280 and 280_a_ which are slidably and telescopically received in shafts 156 and 156_a_, respectively. The elements associated with rod 280 are herein described in detail, it being understood that corresponding parts are also provided in association with rod 280_a_. Shaft 156 includes an enlarged end portion 157 adjacent the operating position, in which a pawl 159 is pivotally mounted. A generally vertical wall 161 is provided in enlarged end portion 159, and cooperates with a tapered end wall 171 to define a chamber for reception of a spring 167. Spring 167 bears against the flattened upper surface of a step portion 169 of pawl 159 to force the step portion 169 outwardly of the shaft, into driving engagement with the slot 34 in reel 28. When solenoid 270 is energized, rod 280 is moved to the right, as viewed in FIGS. 1A and 1B, and its end portion bears against the undersurface of pawl 159, to force portion 169 upwardly against the bias of spring 167 out of engagement with slot 34. With the pawl 159 engaging a slot 34 the spring 167 can be relatively weak and by suitable shaping of the pawl the solenoid actuated rod 280 can be omitted. It should be understood that it is not essential for the driving of the reels to provide slots 34, and spring 167 may be sufficiently strong so that pawl 159 will drivingly engage the wall of a cylindrical reel hole in which case solenoid actuated rod 280 is required.

Figure 10:
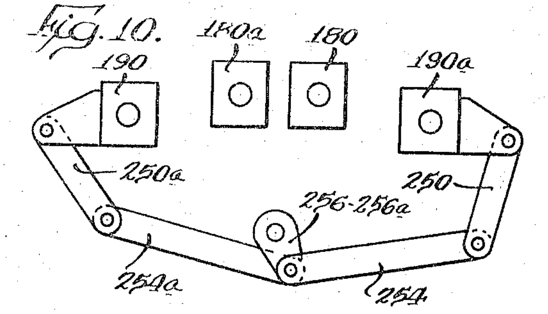
FIG. 10 is a fragmentary elevational view, similar to FIG. 7 but with certain parts broken away for clarity, showing the elements of a linkage in a first operating position.

The direction of tape movement when solenoids 180_a_ and 190_a_ are energized will be best understood from a consideration of FIG. 10 and FIG. 11. As was pointed out above, when solenoid 180_a_ is energized, link 256 is pivoted into the position shown in FIG. 10 by means of the linkage connected to plunger 182_a_. As will be explained more in detail later, solenoids 180_a_ and 190_a_ are connected in parallel, so that they are substantially simultaneously operated. When solenoid 190_a_ is energized, pressure roller 191_a_ forces the tape against capstan 155_a_, which is being rotated in a clockwise direction, as viewed in FIG. 11, through the drive from motor 144_a_. Thus, the tape will move to the right, as viewed in FIG. 11, from reel 28 to reel 30.

Figure 12:
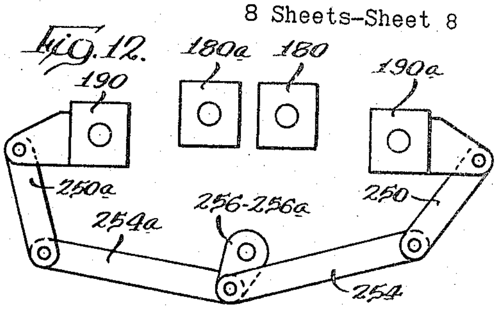
FIG. 12 is a view similar to FIG. 10, but showing the linkage in a second position.

The direction of tape movement when solenoids 180 and 190 are energized will be best understood from FIG. 12 and FIG. 13, and it will suffice to say that the tape, as well as the other rotating elements, move in the opposite direction from that shown in FIG. 11.

Figure 4:
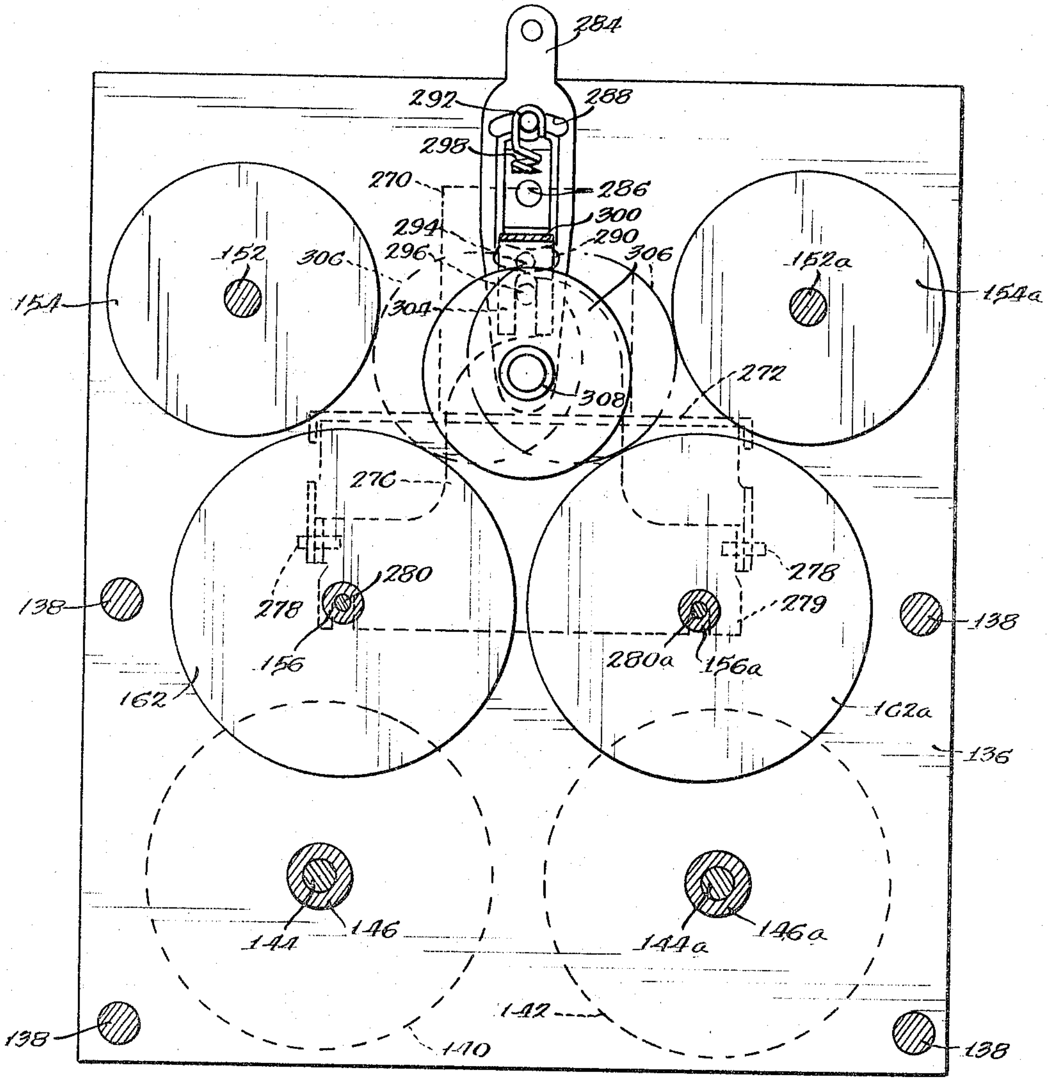
FIG. 4 is a sectional view taken substantially as shown along line 4—4 in FIG. 1A.

As can be best seen in FIG. 4, fast wind and/or fast rewind means are provided, and include a lever 284, which extends above wall 136. It will be readily apparent to those skilled in the art, that lever 284 may be manually operated, or may be pushbutton operated through a dual solenoid action, either of which would function satisfactorily for the purposes of the present invention. Lever 284 is pivotally mounted on wall 136 adjacent its central portion at 286, and includes a pair of arcuate slots 288 and 290, which are each spaced an equal radial distance from pivot 286. Posts 292 and 294 are fixed to wall 136 and extend through slots 288 and 290, respectively. Posts 292 and 294 are engageable with the end portions of slots 288 and 290, to limit the pivotal movement of lever 284, as will hereinafter become more fully apparent. A third post 296 is fixed to lever 284 beneath post 294, and a spring 298 is connected between posts 292 and 296, to urge lever 284 to an overcenter position. A longitudinally extending link 300 is pivotally secured to upper deck 12 at 302 (FIG. 2), with the forward end of the link being bent downwardly as at 304, and grooved for reception of pin 296. Link 300 is mechanically interconnected to links 178 and 178_a_, so that upon movement of lever 284 in a clockwise direction, as viewed in FIG. 4, link 178 will engage finger 260, to move link 254 into engagement with switch operating member 266 to energize motor 140. When link 284 is pivoted in a counterclockwise direction, as viewed in FIG. 4, link 254_a_ will engage switch operating member 266_a_ to energize motor 142.

An idler wheel 306 is rotatably mounted on an arm 308 that is fixed adjacent the end portion of link 284. Idler wheel 306 is formed of a suitable material having a high coefficient of friction, and is movable into simultaneous engagement with wheels 154 and 162, when lever 284 is pivoted in a clockwise direction, as viewed in FIG. 4, and into engagement with wheels 154_a_ and 162_a_, when lever 284 is pivoted in a counterclockwise direction, as viewed in FIG. 4. Since wheels 162 and 162_a_ are respectively fixed to shafts 156 and 156_a_, there will be a direct and positive drive to the take-up reel or supply reel, as the case may be. For example, when wheel 306 has been pivoted into engagement with wheels 154 and 162, wheel 154 will be rotating at a constant speed through the drive from motor 140. Since wheel 306 engages wheel 162 at the same time it engages wheel 154, wheel 162 will be positively driven at a corresponding speed, to rotate shaft 156 and reel 28. Suitable means, not shown, are provided to de-energize solenoids 190 and 190_a_ during the fast wind and fast rewind operations, to prevent damage to the tape.

Figure 9:
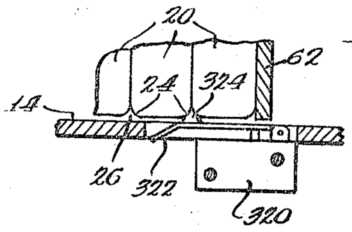
FIG. 9 is a fragmentary sectional view taken substantially as shown along line 9—9 in FIG. 5.
Figure 14:
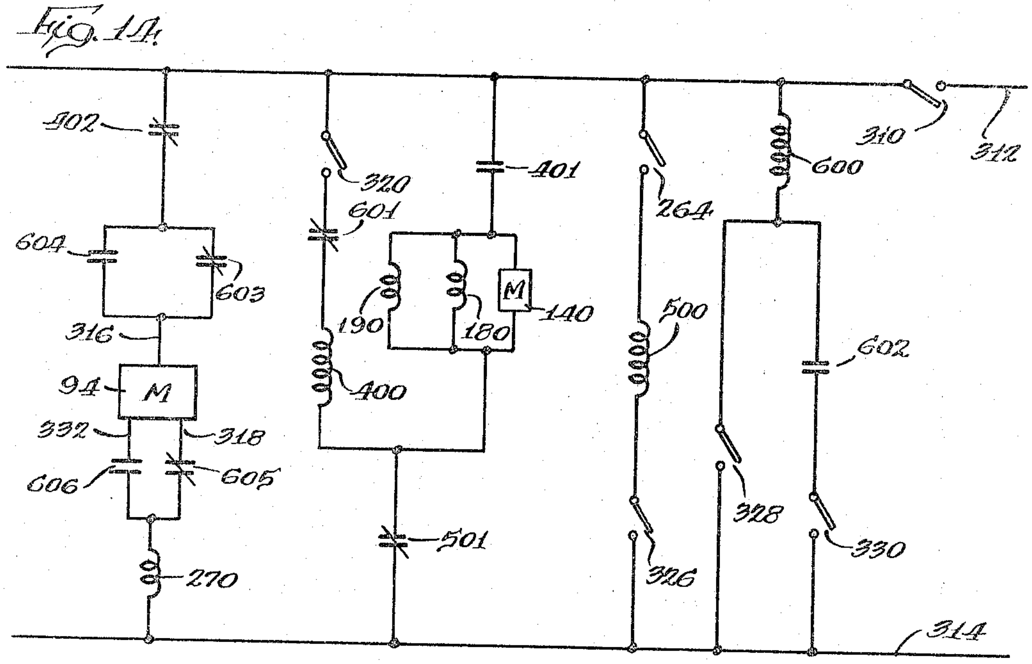
FIG. 14 is an across the line control circuit diagram for a simplified sequential operation of the illustrated structure.
Figure 15:
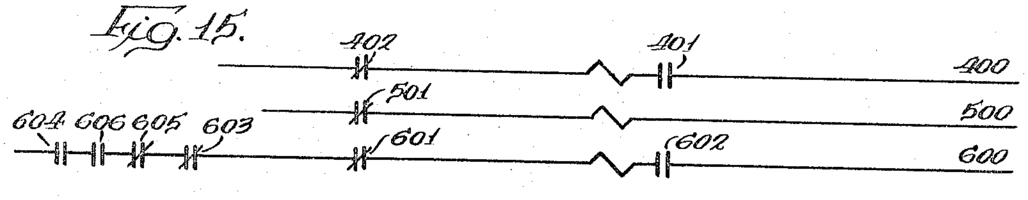
FIG. 15 is a key for FIG. 14.

Referring now to FIG. 14, wherein a control cicruit is shown for a simplified sequence of operation for the above described structure, a main power switch 310 is provided, which is adapted to energize the control circuit through leads 312 and 314, which are connected to a suitable source of electrical energy. The control circuit is hereafter described in terms of the means for rotating capstan 155. However, it should be understood that the circuit functions identically to cause rotation of capstan 155_a_. After the desired number of cartridges have been placed in position, with guide rods 42 and 44 passing through apertures 38 and 40, respectively; with capstans 155 and 155_a_ being positioned in recesses 49 and 53, respectively; with pressure pad fingers 239–241 being positioned in recesses 50–52, respectively; and with shaft portions 157 and 157_a_ being positioned in the bores of reels 28 and 30, respectively; switch 310 is closed to energize the circuit, and start motor 94 in a forward direction through the normally closed contact 402 of a relay 400; the normally closed contact 603 of a relay 600, which is connected to the common electrode 316 of motor 94; and the normally closed contact 605 of relay 600 which is connected between the forward electrode 318 of motor 94, solenoid 270, and line 314. Since solenoid 270 is energized whenever motor 94 is functioning to move the cartridges on the charger, pawls 159 will be retracted out of engagement with the reel keyways so that the cartridges are free to move along shafts 156 and 156*a* without binding. Starting of motor 94 opens switch 326, the movable contact of which is actuated by the armature of motor 94. When motor 94 drives the leading tape cartridge 20 to the operating position, a switch 320 (FIG. 9) is closed by a switch operating member 322, that carries a feeler 324 which senses the gap 26 between adjacent cartridges. It will be understood, of course, that when feeler 324 engages a gap 26, the cartridge is properly centrally located under heads 57, 58 and 59. The closing of switch 320 actuates relay 400 through the normally closed contact 601 of relay 600, and the normally closed contact 501 of relay 500. Actuation of relay 400 causes the normally closed contact 402 of relay 400 to open, stopping the transport motor 94, de-energizing solenoid 270 to allow pawls 159 to drivingly engage the reel keyways, closing switch 326, and causing the normally open contact 401 of relay 400 to close and energize motor 140. Solenoids 180 and 190 are preferably connected in parallel, so that upon the actuation of relay 400, link 254 will engage switch operating member 266 to open switch 264, and capstan 154 will drive the tape 32, as is explained in detail above. At the end of the tape, switch 264 is closed by the tension on the tape, as the tape sweeps across groove 48. The closing of switch 264 causes relay 500 to be actuated, which opens the relay contact 501. The opening of contact 501 de-energizes motor 140, solenoids 180 and 190, and relay 400. Contact 402 thus closes and motor 94 starts, solenoid 270 is energized, switch 326 opens, which turns off relay 500, closing contact 501 and moving the next tape into "play" position. The above sequence is repeated for each tape cartridge until the last tape has been played, when a switch 328, FIG. 1B, is made to close by engagement with follower plate 64, to actuate relay 600. Actuation of relay 600 opens contact 601 to remove power from relay 400, motor 140, and solenoids 180 and 190; and closes contact 602 through a first position switch 330 that latches holding relay 600 and shorts out switch 328. Actuation of relay 600 also opens contacts 603 and 605, and closes contacts 604 and 606 to reverse the direction of motor 94, whose reverse electrode 332 is connected via contact 606 to line 314. When the tape cartridges are returned to the original starting position, switch 330 is opened by engagement with follower plate 64, de-energizing relay 600, and also, through a mechanical linkage (not shown) between switch 330 and switch 310, switch 310 is released shutting off the unit.

It should be understood, of course, that only the simplest operational sequence has been described in the preceding paragraph. It will be readily apparent to those skilled in the art, that the subject apparatus is capable of functioning in a much more elaborate sequence. For example, after completing playback in one direction, the unit can automatically reverse itself to playback the other track. On a two track tape in stereo, both tracks are used at once in one direction, using up the entire tape, and it could then rewind automatically. With a four track stereo tape, two directional runoffs of tape can make use of the reversal feature mentioned to play two tracks in one direction and two tracks in the other direction. The unit also can be used for four track monophonic playback where it is necessary to switch back, forward, and back again to use up four tracks of the tape. Such variations are best controlled when like track cartridges are played at one loading. However, intermixing of various track formulations are possible with additional electronic control systems. In addition, assuming that a full stack of cartridges have been played, the unit and circuitry can be arranged to play the same stack back again with the previous first cartridge then being played last.

From the foregoing, it should be apparent that each of the objects of the invention has been fully achieved.

We claim:

1. A magnetic recorder utilizing tape cartridges each having a length of tape extending between reel means, said reel means including a reel having a center drive opening, said recorder comprising, a tape drive capstan and magnetic heads mounted at a fixed position and defining a tape path, a frame, means on the frame for holding a plurality of tape cartridges in assembled relation with each cartridge having said length of tape disposed in the plane of said path in alignment therewith and exposed for movement along the tape path, means for moving all of said cartridges simultaneously to move successive cartridges to a position having the exposed length of tape in said tape path, means for locating a selected cartridge at said position and initiating advancement of the tape relative to the cartridge by operation of the capstan, and a reel drive shaft extending from one end of the frame and positionable through the reel drive openings of a plurality of cartridges, and means on said shaft at said position for driving only the reel in a cartridge at said position.

2. A magnetic recorder using tape cartridges each having a length of tape extending between reel means comprising: a frame; magnetic heads mounted at a fixed position on said frame; an elongate shaft rotatable at a fixed position on said frame and extending longitudinally relative to said frame, said shaft having a portion adjacent said magnetic heads defining a tape drive capstan; a pressure roller mounted on said frame in alignment with said capstan; said magnetic heads, capstan and pressure roller cooperating to define a tape path; means on the frame for holding a plurality of tape cartridges in assembled relation with each cartridge having said length of tape disposed in the plane of said path in alignment therewith and exposed for movement along the tape path; means for moving all of said cartridges simultaneously longitudinal of said frame to move successive cartridges to a position having the exposed length of tape in said tape path, said cartridges each having clearance means thereon positioned in longitudinal alignment with said shaft and pressure roller and receiving the shaft therein, thereby enabling said cartridges to move longitudinally relative to said shaft so that said shaft capstan can engage a tape associated with an intermediate cartridge; means at an end of the frame for driving the capstan shaft; and means for locating a selected cartridge at said position and initiating advancement of the tape relative to the cartridge by operation of the capstan.

3. A magnetic recorder as defined in claim 2 including a brake release member mounted on said frame at said position for engagement with a cartridge brake for release thereof.

4. A tape recorder having a frame, a tape drive capstan and spaced apart pressure roller, a magnetic head and a spaced apart backing member for the head with the space between defining a planar tape path, means for holding a plurality of tape cartridges each having an exposed length of tape positionable in said path, means mounting the cartridge holding means for movement in a direction parallel to the plane of said tape path and from end to end of the frame to locate a cartridge in playing position with the exposed tape in the path and with cartridges located at one or both sides of the tape path, said capstan and backing member being located between the ends of the frame and positioned to lie in recesses in the cartridge, and means at an end of said frame movably mounting both of said backing member and capstan.

5. A tape recorder as defined in claim 4 including means for moving the pressure roller into engagement with the drive capstan, means interconnecting the pressure roller and said backing member for simultaneous movement, and means responsive to a cartridge reaching playing position for actuating the pressure roller moving means.

6. A tape recorder having a frame with a support plate, an elongate shaft extending from the support plate and having a drive capstan thereon located at a distance from the plate, a pair of alternately driven shafts extending from the plate and spaced from each other, a holder for a plurality of cartridges movably mounted on said frame and holding the cartridges with a pair of internal reels having their center openings aligned with said driven shafts, and means for advancing said holder to place a cartridge at a playing position with an exposed length of tape in a path including said capstan and with the cartridge reels on said driven shafts.

7. A tape recorder as defined in claim 6 in which each of said driven shafts has a spring pressed pawl located to engage within a reel, and means for retracting said pawls within the periphery of said shafts during movement of the cartridges.

8. A tape recorder as defined in claim 6 in which said holder includes a pair of plates movable one relative to the other, means for locking said plates together at varying distances depending on the number of cartridges in the holder, and said advancing means including a motor and drive member operatively connected to one of said plates.

9. A tape recorder as defined in claim 8 in which a pair of rails ars connected to one of said plates and support said cartridges for movement with the holder in cartridge advancing movement.

10. A tape recorder as defined in claim 7 including a circuit having a switch for sensing the location of a cartridge in playing position and actuated by a cartridge to stop said holder advancing means and initiate operation of tape advance by the capstan.

11. A tape recorder as defined in claim 10 wherein said circuit includes a solenoid for operating each of said pawls, said solenoid being energized in response to the actuation of said switch.

12. A tape recorder as defined in claim 10 wherein said circuit includes a second switch for starting said holder advancing means, and wherein means are provided for actuating said second switch in response to the end of tape play.

13. A tape recorder having a frame with a support plate; an elongate shaft extending from the support plate and having a drive capstan thereon located at a distance from the plate; a pair of alternately driven shafts extending from the plate and spaced from each other; a holder for a plurality of cartridges movably mounted on said frame and holding the cartridges with a pair of internal reels having their center openings aligned with said driven shafts, said holder including a pair of plates movable one relative to the other, means for locking said plates together at varying distances depending on the number of cartridges in the holder, a pair of rails connected to one of said plates and supporting said cartridges for movement with the holder in cartridge advancing movement; each of said driven shafts having a spring pressed pawl located to engage within a reel; means for advancing said holder to place a cartridge at a playing position with an exposed length of tape in a path including said capstan and with the cartridge reels on said driven shafts, said advancing means including a motor and drive member operatively connected to one of said plates; and means for retracting said pawls within the periphery of said shafts during movement of the cartridges.

14. A tape recorder comprising: a frame; a tape drive capstan rotatably mounted on said frame; a layer pivotally mounted on said frame; a pressure roller on said lever and spaced from said capstan; a magnetic head on said frame; a backing member pivotally mounted on said frame and spaced from said head with the space therebetween defining a planar tape path; means for holding a plurality of tape cartridges each having an exposed length of tape positionable in said path; means mounting the cartridge holding means for movement in a direction parallel to the plane of said tape path and from end to end of the frame to locate a cartridge in playing position with the exposed tape in the path and with cartridges located at one or both sides of the tape path; said capstan and backing member being located between the ends of the frame and positioned to lie in recesses in the cartridge; means interconnecting said link and said backing member for simultaneously moving said pressure roller into engagement with said capstan and said backing member into engagement with said head; and means responsive to a cartridge reaching playing position for actuating said last named means.

15. A tape recorder comprising: a frame with a generally horizontal slideway; a support plate mounted on said frame; an elongate shaft extending from the support plate and having a drive capstan thereon located at a distance from the plate intermediate the ends of said slideway; a pair of alternately driven shafts extending from the plate and spaced from each other; a holder for a plurality of cartridges movably mounted on said frame for general horizontal movement in said slideway and holding the cartridges with a pair of internal reels having their center openings aligned with said driven shafts; and means for advancing said holder to place a cartridge at a playing position with an exposed length of tape in a path including said capstan and with the cartridge reels on said driven shafts.

16. A tape recorder as defined in claim 15 wherein said elongate shaft and said driven shafts are generally horizontally disposed and parallel to one another.

17. A tape recorder having a frame, a tape drive capstan and spaced apart pressure roller, a magnetic head and a spaced apart backing member for the head with the space between defining planar tape path, means for holding a plurality of tape cartridges each having an exposed length of tape positionable in said path, means mounting the cartridge holding means for movement in a direction parallel to the plane of said tape path and from end to end of the frame to locate a cartridge in playing position with the exposed tape in the path and with cartridges located at one or both sides of the tape path, said capstan and backing member being located between the ends of the frame and positioned to lie in recesses in the cartridge, means for guiding each of said cartridges throughout the range of cartridge movement, means for moving the pressure roller into engagement with the drive capstan, means interconnecting the pressure roller and said backing member for simultaneous movement, and means responsive to a cartridge reaching playing position for actuating the pressure roller moving means.

18. A tape recorder comprising: a frame; a support plate mounted on said frame; an elongate shaft extending from the support plate and having a drive capstan thereon located at a distance from the plate; a pair of alternately driven shafts extending from the plate and spaced from each other; a holder for a plurality of cartridges movably mounted on said frame and holding the cartridges with a pair of internal reels having their center openings aligned with said driven shafts; means for advancing said holder to place a cartridge at a playing position with an exposed length of tape in a path including said capstan and with the cartridge reels on said driven shafts; and means on said holder for supporting said capstan shaft.

19. A tape recorder comprising: a frame; a support plate fixedly mounted on said frame; a pair of spaced, alternately driven shafts extending from the support plate and each having a single drive capstan thereon located at a distance from the plate to define a storage area between said support plate and said capstans; a holder for a stack of cartridges movably mounted on said frame; and means for advancing said holder to place a cartridge at a playing position with an exposed length of tape in a path including said capstans, said advancing means being operative to position one or more cartridges in said storage area when a cartridge other than the first cartridge in said stack is in said playing position.

20. A tape recorder comprising: a frame; a support plate mounted on said frame; a first pair of spaced, alternately driven shafts extending from the support plate and each having a drive capstan thereon located at a distance from the plate; a second pair of alternately driven shafts extending from the plate and spaced from each other; a holder for a plurality of cartridges movably mounted on said frame and holding the cartridges with a pair of internal reels having their center openings aligned with said second pair of driven shafts; means for advancing said holder to place a cartridge at a playing position with an exposed length of tape in a path including said capstans and with the cartridge reels on said second pair of driven shafts; and means for selectively and simultaneously driving one shaft of each of said pairs of shafts to move said tape in one direction along said tape path.

References Cited by the Examiner

UNITED STATES PATENTS

| | | | |
|---|---|---|---|
| 2,821,576 | 1/1958 | Gaubert | 274—4 |
| 3,001,025 | 9/1961 | Gaubert | 274—4 |
| 3,100,090 | 8/1963 | Goodell | 242—55.13 |
| 3,140,360 | 7/1964 | Whitworth | 179—100.2 |
| 3,183,494 | 5/1965 | Welsh | 179—100.2 |

NORTON ANSHER, *Primary Examiner.*

C. B. PRICE, *Assistant Examiner.*